Figure 1:
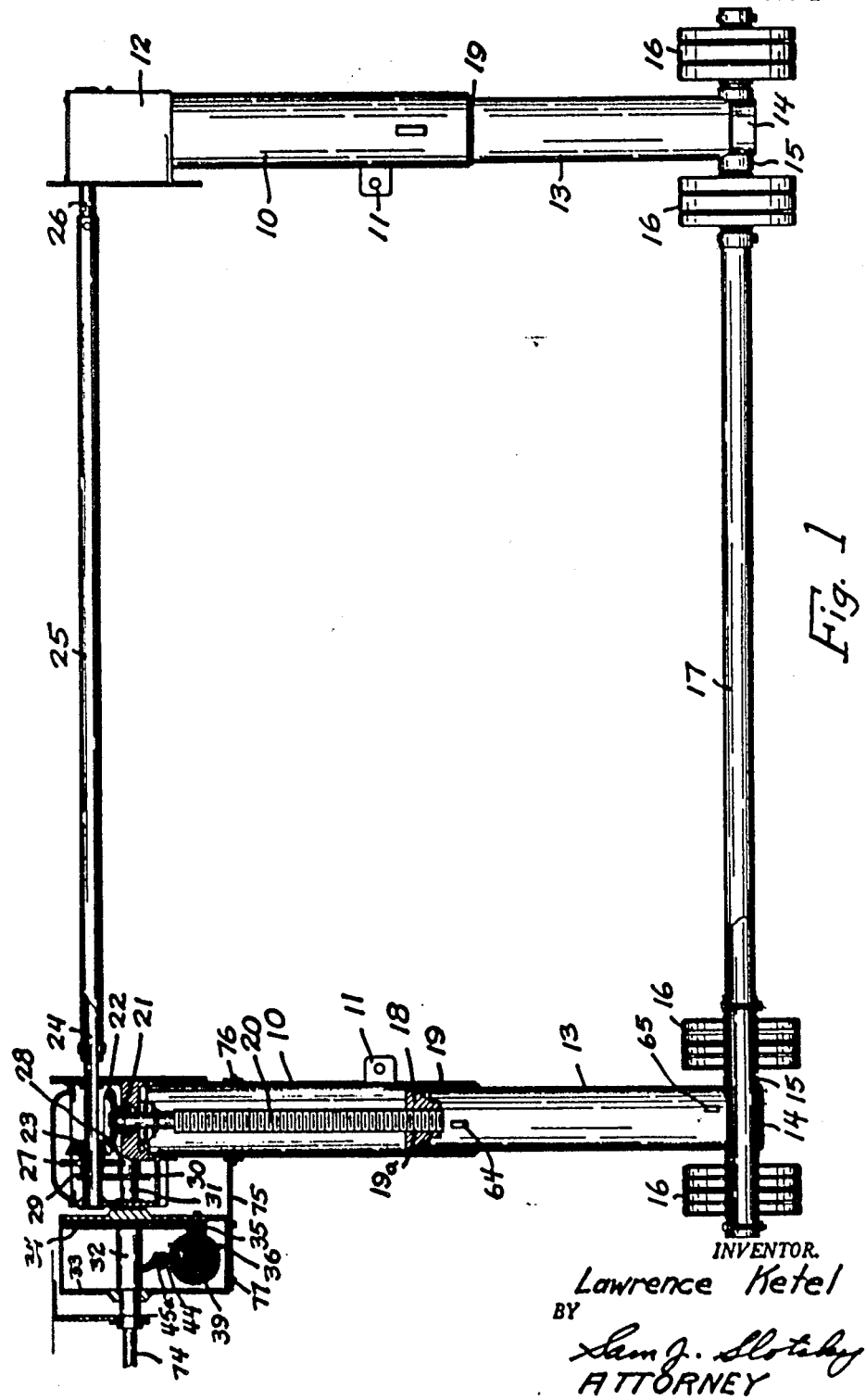

Jan. 14, 1964     L. KETEL     3,117,766
REMOTELY CONTROLLED LANDING GEAR
Filed June 29, 1961     4 Sheets-Sheet 1

INVENTOR.
Lawrence Ketel
BY
Sam J. Slotsky
ATTORNEY

Jan. 14, 1964 L. KETEL 3,117,766
REMOTELY CONTROLLED LANDING GEAR
Filed June 29, 1961 4 Sheets-Sheet 2
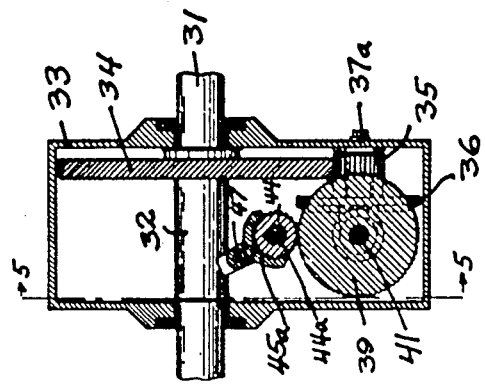
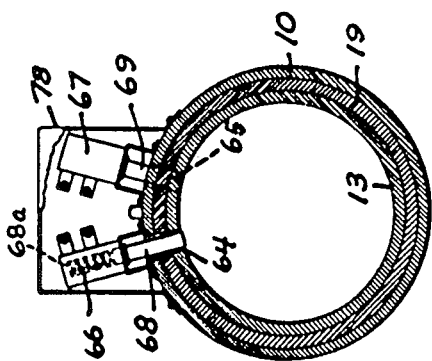
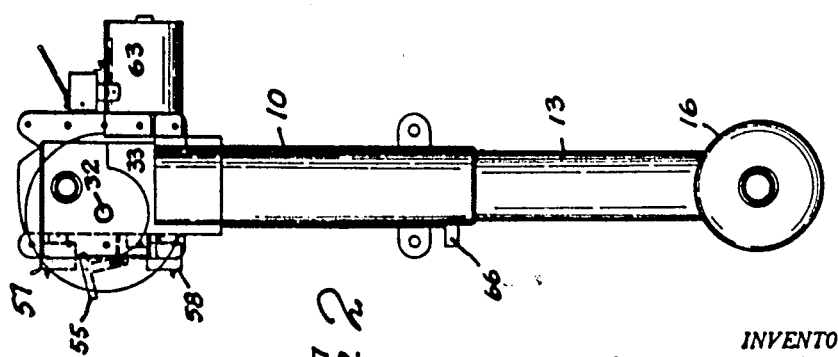
INVENTOR.
Lawrence Ketel
BY
ATTORNEY

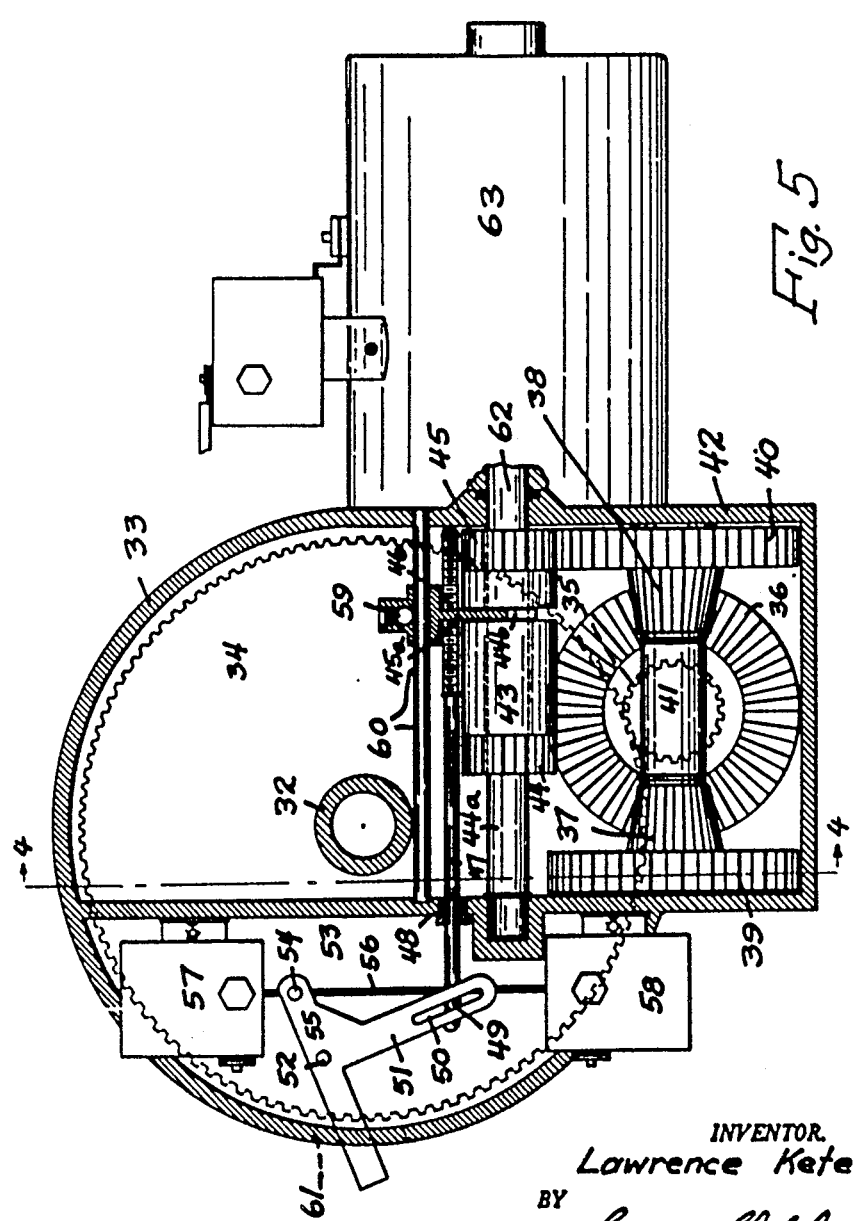

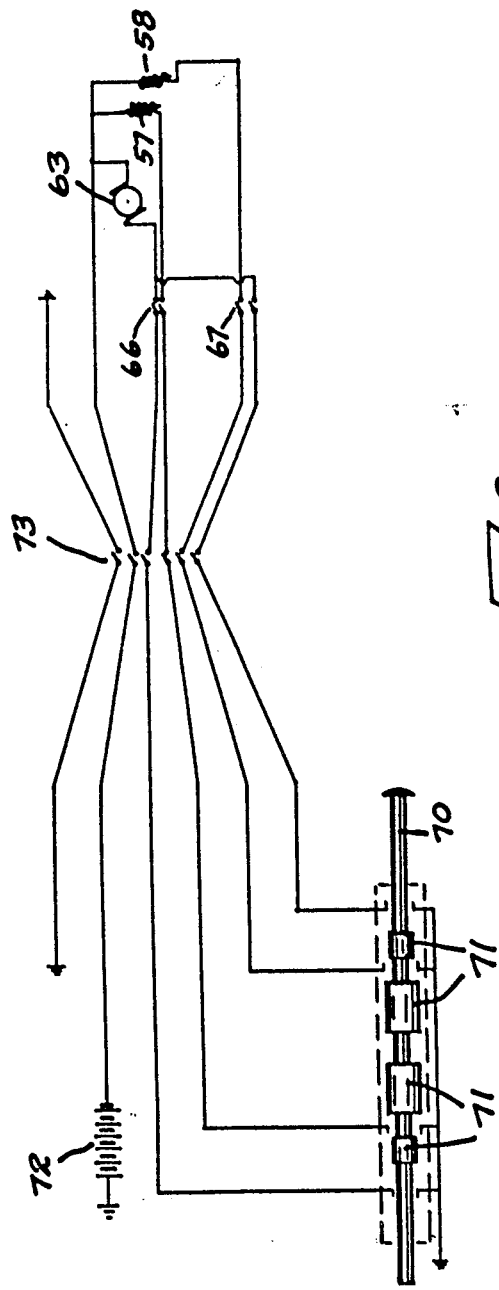

United States Patent Office 3,117,766
Patented Jan. 14, 1964

3,117,766
REMOTELY CONTROLLED LANDING GEAR
Lawrence Ketel, 1850 Illinois St. SW., Huron, S. Dak.
Filed June 29, 1961, Ser. No. 120,689
1 Claim. (Cl. 254—86)

My invention relates to a landing gear for semi-trailer trucks.

An object of my invention is to provide a landing gear which can be conveniently controlled by the operator of the semi-trailer truck, and in which there will be provided means whereby the landing gear will be operated from the storage battery of the vehicle or any other desired electrical source.

A further object of my invention is to provide such electrical operating means so that the landing gear will be operated without requiring manual operation thereof, with means being provided however whereby manual operation can be effected when necessary.

A further object of my invention is to provide automatic means whereby the operating motor will be shut off at the landing gear upper range, or at its lowest range.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a partially sectional view of my device,
FIGURE 2 is an end view of FIGURE 1,
FIGURE 3 is an enlarged generally sectional view of the automatic contact arrangement,
FIGURE 4 is a sectional view taken generally along the line 4—4 of FIGURE 6,
FIGURE 5 is an enlarged sectional view taken generally along the line 5—5 of FIGURE 5, and
FIGURE 6 is a schematic view of the electrical circuit.

My invention contemplates the provision of a landing gear for semi-trailers, and wherein the landing gear is operated by means of an electric motor to either raise or lower the landing gear as desired, etc.

In describing my invention I have used the character 10 to indicate vertically positioned cylindrical housings including the ears 11 for providing suitable attachment to a trailer body, so that the landing gear can be attached thereto, and I have further used the character 12 to indicate an upper housing including a suitable bevel gear arrangement in common with most landing gears manufactured to date, for raising or lowering the lower inner housing 13 which is attached as at 14 to a lower structure 15 to which the wheels 16 are attached, the wheels 16 being coupled to the transverse member 17, and whereby these wheels will roll upon the ground surface. At the left-hand side of the arrangement as shown in FIGURE 1, a substantially similar structure is provided as far as the mechanical arrangement is concerned, and wherein I provide the member 18 which is firmly secured to the further inner telescoping member 13, the character 19 indicating intermediate cylinders, the greater part of the structure at the right-hand side of FIGURE 1 being substantially the same throughout as explained above.

Threadably engaging the members 18 at 19a are the lengthened screws 20, so that suitable rotation of the screws 20 will correspondingly raise or lower the members 18 together with the members 13.

In considering the left hand side of FIGURE 1 the upper end of the screw 20 is suitably attached as at 21 to a bevel gear 22 which meshes with the further bevel gear 23 to which bevel gear 23 is attached the transverse shaft 24 which is attached to the coupling member 25 which drives the shaft 26, which in turn drives a similar bevel gear arrangement for operating the right hand member 13.

The character 27 indicates an auxiliary gear attached to the shaft 24 which can be used with the gear 28 if desired for increasing the power of the arrangement, and the character 29 indicates a further flat gear adapted to mesh with the larger flat gear 30 which is attached to the shaft 31.

The shaft 31 is suitably coupled or attached to a further shaft 32. The shaft 32 is suitably journalled within a casing 33 and is securely attached to a further large gear 34 which gear 34 meshes with a smaller gear 35 (see FIGURES 4 and 5), with the gear 35 being attached to a bevel gear 36, this arrangement being suitably journalled as at 37a (see FIGURE 4).

The bevel gear 36 meshes with a further pair of bevel gears 37 and 38 which are attached to the further gears 39 and 40, these gears being journalled on the shaft 41 which is suitably attached within the casing portion 42. The character 43 indicates a gear element having the gear portions 44 and 45 at either end thereof which gear element is slidably engaged on the rod 44a which is attached to the casing walls, and the gear element 43 includes the annular slot portion 44b adapted to engage the fork 45a which is suitably secured as at 46 to a further rod 47 which is adapted to slide through the bushing 48, and attached to the rod 47 is a pin 49 which is received within the slot 50 which is provided within the portion 51 of a rocking member which is pivoted at 52 to a wall 53 of the casing, and pivotally attached at 54 to the rocking portion 55 is a solenoid rod 56 which includes solenoid plungers at each end and which plungers are actuated by either solenoid 57 or 58, it thus being noted that actuation of either solenoid will provide means for moving the rod 47 in either direction to thereby engage either the gear element 44 with the gear 39, or the gear element 45 with the gear 40 to thereby provide means for changing the direction of rotation of operation.

The character 59 indicates a spring urged ball element provided in combination with the fork 45a, the character 60 indicating indentations for providing stop means. The character 61 indicates a slot in which the portion 55 will operate.

The character 62 indicates the electric motor shaft, the electric motor being indicated by the character 63, which motor is therefore adapted to drive the further integral shaft portion 44a which is the end portion of the shaft 62, and to therefore drive the entire arrangement.

The character 64 indicates an upper slot in the left-hand member 13, and the character 65 indicates a lower slot therein. Attached to the stationary left-hand member 10 as viewed in FIGURE 1, are a pair of contact switches 66 and 67 (see FIGURES 2 and 3) which switches are operated by the plungers 68 and 69, these plungers 68 and 69 being adapted to be spring urged by the springs 68a into the slots 64 or 65, and with these switches being adapted to open the circuits to thereby stop the motor when the landing gear reaches either its upper-most or lower-most position, so that in effect the circuit will be automatically broken at either point, thereby providing a fool-proof arrangement.

For instance, as shown in FIGURE 3, the plunger 68 will have the circuit broken at the switch 66, the section at FIGURE 3 being taken somewhat freely to show the operation of both switches and slots.

FIGURE 6 illustrates the electrical circuit, the character 70 indicating a dash-mounted switch with the contact elements 71 providing a method of operating the circuit when the element 70 is either pushed inwardly or pulled outwardly, which thereby control the circuit, the character 72 indicating the battery, the character 73 indicating generally a male and female socket arrangement which can be pulled apart when desired.

It will thus be noted from the fore-going description that my invention will function as stated in the objects of my invention, or in other words will provide a convenient arrangement whereby the operator will not at all find it necessary to raise and lower the landing gear by the laborious process of manually operating the same, and will provide means whereby the lowering and raising action is conveniently effected.

It should also be especially noted that through the various gearing arrangements described, the smooth application of maximum power is provided without the use of extra worm gears or worms, which would not allow for the convenient operation of the slidable gear arrangements described herein.

The extending portion 74 of the shaft 32 can be arranged to have an auxiliary handle attached thereto, in those cases where it may be desired to operate the arrangement without the electrical source.

The character 75 (see FIGURE 1) indicates a brace which is clamped at 76 to the member 10 and at 77 to the casing 33, which is provided to prevent retrograde movement of the casing 33.

The switches 66 and 67 are covered by the cap 78, suitably seated to keep out dust and moisture.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

A remotely controlled landing gear comprising a pair of laterally spaced lift members including upper sections, lower sections slidably engaged with said upper sections, means for raising and lowering said lower sections including threaded members attached to said lower sections, lengthened screws threadably engaging said threaded members, means for rotating said screws including bevel gears, means for operating said bevel gears including a shaft, means for driving said shaft including a casing, a further shaft mounted in said casing and attached to said shaft, means for electrically driving said further shaft, said electrical driving means including an electric motor, a plurality of gears positioned between the electric motor drive shaft and said further shaft for driving said further shaft, means for disconnecting said electric motor when said landing gear is at its lowest position, and when said landing gear is at its uppermost position, including vertically spaced slots in one of said lower sections, contact switches attached to one of said upper sections, said contact switches including plungers adapted to break the circuit to said motor and means for spring urging each of said plungers into said slots.

References Cited in the file of this patent
UNITED STATES PATENTS
2,131,296    Petsche et al.  ---------- Sept. 27, 1938
2,817,493    Belcher  ---------------- Dec. 24, 1957
FOREIGN PATENTS
1,095,463    France  ---------------- Dec. 22, 1954